United States Patent
Yoon et al.

(10) Patent No.: US 12,259,772 B2
(45) Date of Patent: Mar. 25, 2025

(54) POWER MANAGEMENT CIRCUIT AND TOUCH/DISPLAY DEVICE INCLUDING THE SAME

(71) Applicant: LX Semicon Co., Ltd., Daejeon (KR)

(72) Inventors: Seong Sik Yoon, Daejeon (KR); Moon Ho Jang, Daejeon (KR); Dal Eun Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 110 days.

(21) Appl. No.: 17/940,520

(22) Filed: Sep. 8, 2022

(65) Prior Publication Data

US 2023/0080254 A1    Mar. 16, 2023

(30) Foreign Application Priority Data

Sep. 10, 2021  (KR) .......................... 10-2021-0120751

(51) Int. Cl.
*G06F 1/3218*   (2019.01)
*G06F 1/16*     (2006.01)
*G06F 1/3234*   (2019.01)

(52) U.S. Cl.
CPC ............ *G06F 1/3218* (2013.01); *G06F 1/169* (2013.01); *G06F 1/3262* (2013.01); *G06F 1/3265* (2013.01)

(58) Field of Classification Search
CPC ...... G06F 1/169; G06F 1/3218; G06F 1/3262; G06F 1/3265
See application file for complete search history.

(56) References Cited

U.S. PATENT DOCUMENTS

| | | | |
|---|---|---|---|
| 9,911,371 B2* | 3/2018 | Sugiyama | G09G 3/20 |
| 2015/0199102 A1* | 7/2015 | Koh | G06F 3/041661 |
| | | | 715/835 |
| 2017/0153736 A1* | 6/2017 | Kim | G06F 3/0443 |
| 2021/0149474 A1* | 5/2021 | Choi | G06F 3/04166 |

FOREIGN PATENT DOCUMENTS

| | | |
|---|---|---|
| KR | 2018-0075168 A | 7/2018 |
| KR | 2020-0117849 A | 10/2020 |

* cited by examiner

*Primary Examiner* — Terrell S Johnson
(74) *Attorney, Agent, or Firm* — ROTHWELL, FIGG, ERNST & MANBECK, P.C.

(57) ABSTRACT

A power management circuit includes a control signal reception circuit configured to receive a power control signal for controlling an operation of the power management circuit in correspondence to a driving mode of a panel, from a microcontroller which receives information on the driving mode of the panel; an output signal change circuit configured to change an output signal of the power management circuit in response to the power control signal; a control target selection circuit configured to select a control target circuit to which the output signal is to be transferred; and an output signal transmission circuit configured to transfer the output signal to the control target circuit.

20 Claims, 10 Drawing Sheets

300

POWER MANAGEMENT CIRCUIT AND TOUCH/DISPLAY DEVICE INCLUDING THE SAME

CROSS REFERENCE TO RELATED APPLICATION

This application claims priority to Republic of Korea Patent Application No. 10-2021-0120751, filed on Sep. 10, 2021, which is hereby incorporated by reference in its entirety.

BACKGROUND

1. Field of Technology

The present disclosure relates to a power management circuit and a touch/display device including the same.

2. Related Technology

A display device capable of a touch input on a display screen, for example, a touch/display device, is being applied to various electronic devices.

The touch/display device may implement touch and display in various forms by using an on-cell type in which a touch panel is attached to a display panel or using an in-cell type in which a touch electrode is built in a display panel.

By using some of common electrodes of the touch/display device as touch electrodes, touch and display may be simultaneously implemented in one device. By time-dividing one time period into a display driving period in which image data is transmitted to a common electrode and a touch driving period in which a touch driving signal is transmitted to a touch electrode, the driving cycles of the touch and display may be adjusted.

In order to reduce the power consumption of the display device, it is necessary to supply power differently during a time period in which the display device performs display driving and a time period in which the display device performs touch driving. When the display device performs a display operation, power for touch sensing is also consumed, and even when the display device performs a touch sensing operation, power for display is also consumed. Therefore, in the case where power to be supplied is not adjusted regardless of the type of an operation of the display device, the power consumption of the panel increases. For example, when the touch sensing operation is performed without performing the display operation, standby power is supplied to a circuit for display driving, and thus, a power loss problem is caused.

In addition, when the type of an operation of the display device is the touch sensing operation and when the type of an operation of the display device is the display operation, the type and strength of an output signal received from a power management circuit for each operation may vary. In this regard, if the output signal of the power management circuit is not controlled by subdividing the operation of the display device, a problem may be caused in that the power consumption of the panel increases.

Moreover, when a separate device, for example, a multiplexer, a switch, an interface, a communication port, etc., is added to change an operation of the display device to a circuit for the display driving or a circuit for the touch driving according to the type of an operation of the display device, limitations may be caused in that the manufacturing process of the panel is complicated and the manufacturing cost increases.

The discussions in this section is only to provide background information and does not constitute an admission of prior art.

SUMMARY

Various embodiments are directed to a power management circuit and a touch/display device including the same, capable of reducing the power consumed in a display operation and a touch sensing operation, by changing the internal operation of a display device without adding a separate device, for example, a multiplexer, a switch, an interface and so forth, to the display device.

Also, various embodiments are directed to a power management circuit and a touch/display device including the same, capable of optimizing the power consumption management of a panel by changing the state of a signal outputted from the power management circuit according to a driving mode of the panel.

In an embodiment, a power management circuit may include: a control signal reception circuit configured to receive a power control signal for controlling an operation of the power management circuit in correspondence to a driving mode of a panel, from a microcontroller which receives information on the driving mode of the panel; an output signal change circuit configured to change an output signal of the power management circuit in response to the power control signal; a control target selection circuit configured to select a control target circuit to which the output signal is to be transferred; and an output signal transmission circuit configured to transfer the output signal to the control target circuit.

In an embodiment, a microcontroller for acquiring touch information of a panel may include: a driving mode determination circuit configured to receive information on a driving mode of the panel from a host device and to determine a touch or display operation of the panel; a control signal generation circuit configured to generate a power control signal which changes an output signal of a power management circuit in correspondence to the driving mode of the panel; and a communication circuit configured to communicate with the power management circuit by transferring the power control signal to the power management circuit.

In an embodiment, a method of operating a power management circuit may include: receiving information on a driving mode of a panel from a microcontroller; determining an output signal of the power management circuit corresponding to the driving mode of the panel; determining a target circuit to which the output signal is to be transferred, among candidate circuits having a possibility of receiving the output signal; and transferring the output signal to the target circuit.

As described above, according to the embodiments of the present disclosure, the power consumed in a panel may be reduced by changing the operation of a power management circuit according to a driving mode of the panel regardless of the type of input power supplied to the power management circuit and the number of input power.

In addition, according to the embodiments of the present disclosure, a touch sensing function and a display function may be provided with a more simplified circuit configuration by changing the internal operation of a display device without adding a separate device, for example, a multiplexer, a switch, an interface, etc., to the display device, and the power consumed in a display circuit and a touch sensing circuit may be reduced.

Moreover, according to the embodiments of the present disclosure, when the touch sensing operation is performed without performing the display operation according to a driving mode of the panel, the power supplied to an integrated circuit in the display device may be controlled to reduce power loss due to the standby power consumed in the integrated circuit.

DETAILED DESCRIPTION OF EMBODIMENTS

Figure 1:
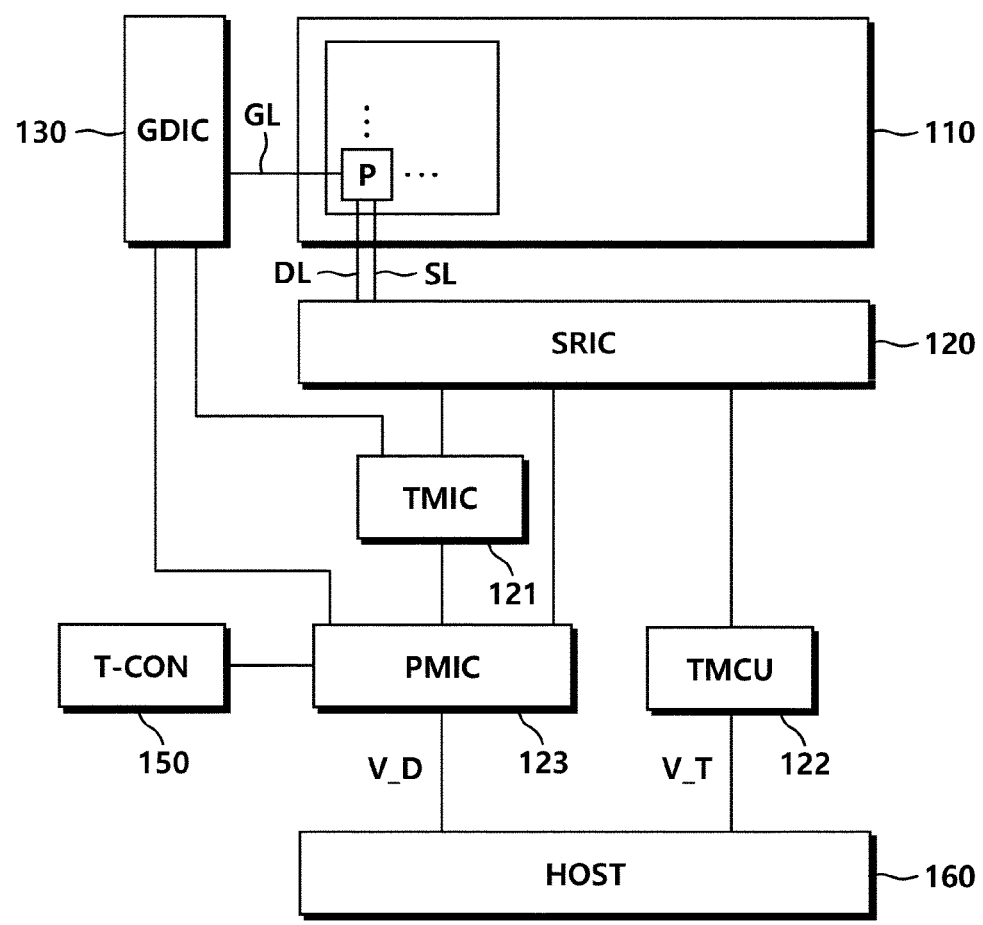
FIG. 1 is a diagram illustrating the configuration of a touch sensing circuit in accordance with an embodiment of the present disclosure.

FIG. 1 is a diagram illustrating the configuration of a touch sensing circuit in accordance with an embodiment of the present disclosure.

Referring to FIG. 1, a display device 100 may include a panel 110, a source readout circuit (SRIC) 120, a touch modulation circuit (TMIC) 121, a microcontroller (MCU) 122, a power management circuit (PMIC) 123, a gate driving circuit (GDIC) 130, a timing controller (TCON) 150, and a host 160.

In the panel 110, a plurality of data lines DL and a plurality of gate lines GL may be disposed, and a plurality of pixels P may be disposed. The pixel P may be composed of a plurality of sub-pixels (SP).

The panel 110 may include both a common electrode and a touch electrode to implement a touch sensing function and a display function, and the common electrode and the touch electrode may form one electrode. The touch electrode may sense a touch or proximity of an object using one of a mutual capacitance scheme and a self capacitance scheme.

The source readout circuit 120 may include therein a source driver circuit (SDIC). The source driver circuit may supply a data voltage to the sub-pixel (SP) through the data line DL. The data voltage supplied to the data line DL may be supplied to the sub-pixel (SP) according to a gate driving signal.

In addition, the source readout circuit 120 may include therein a readout circuit (ROIC). The readout circuit may be built in the source readout circuit 120 together with the source driver circuit. The readout circuit may transfer a touch driving signal to the touch electrode around the sub-pixel (SP) and receive touch sensing data as a signal change amount of the touch electrode, through a sensing line SL.

The touch modulation circuit 121 may receive the output voltage of the power management circuit 123, and during a touch driving period, may synchronize and modulate a voltage to be transferred to the source readout circuit 120 and a voltage to be transferred to a level shifter (not shown) connected to the gate driving circuit 130.

The touch modulation circuit 121 may generate a zero load driving signal (ZLD) and transmit the zero load driving signal (ZLD) to the panel 110 and the gate driving circuit 130 in order to reduce the influence exerted on a sensing result by the parasitic capacitance of a touch sensor. The zero load driving signal (ZLD) may have the same phase as a driving signal for driving the touch sensor. When the zero load driving signal (ZLD) is applied to both electrodes of a parasitic capacitor together with the driving signal, the amount of charge charged in the parasitic capacitor may become 0, and thus, a parasitic capacitance may disappear.

The microcontroller 122 may be connected to the source readout circuit 120 to transmit and receive data. The microcontroller 122 may transmit control data for controlling the source readout circuit 120 to the source readout circuit 120. The source readout circuit 120 may generate touch sensing data by sensing a touch or proximity of an object from the touch sensor, and may transmit the touch sensing data to the microcontroller 122. The microcontroller 122 may be defined as a touch microcontroller (TMCU), a microprocessor or a touch control circuit.

The microcontroller 122 and the source readout circuit 120 or the microcontroller 122 and the power management circuit 123 may communicate on the basis of a serial peripheral interface (SPI) method or an inter-integrated circuit (I2C) method. In the SPI or I2C method, communication subjects may operate as a master and a slave. The microcontroller 122 may operate as a master, and the source readout circuit 120 or the power management circuit 123 may operate as a slave.

The power management circuit 123 may supply power to the panel 110, the source readout circuit 120, the touch modulation circuit 121, the microcontroller 122, the gate driving circuit 130 and the timing controller 150. The power management circuit 123 may supply power by transmitting a driving voltage to each circuit through a power line, and the voltage applied to each circuit may be set differently according to the characteristics of the circuit. The power management circuit 123 may serve as a power source for internal circuits of the display device 100.

The power management circuit 123 may differently change and supply a voltage to be applied to each circuit according to the type of power inputted from the host 160. The power management circuit 123 may include at least one booster circuit to increase an output voltage, and may include at least one buck circuit to decrease an output voltage.

The power management circuit 123 may supply an output voltage to an internal circuit by changing the intensity, frequency, waveform, etc. of the output signal, and may change a target to which the output signal is to be transferred. By appropriately changing the output signal of the power management circuit 123 in correspondence to a driving mode of the panel 110, power to be consumed by the display device 100 may be effectively reduced.

The gate driving circuit 130 may supply a gate driving signal of a turn-on voltage or a turn-off voltage to the gate line GL. When the gate driving signal of a turn-on voltage is supplied to the sub-pixel (SP), the sub-pixel (SP) is connected to the data line DL. When the gate driving signal of a turn-off voltage is supplied to the sub-pixel (SP), the connection between the sub-pixel (SP) and the data line DL is released.

The timing controller 150 may receive image data, a timing signal, etc. from the host 160, and may supply control signals to the gate driving circuit 130 and the microcontroller 122. For example, the timing controller 150 may transmit a gate control signal, which causes a scan to be started, to the gate driving circuit 130. The timing controller 150 may output image data (RGB) to the microcontroller 122. The timing controller 150 may transmit a data control signal (DCS), which controls the source readout circuit 120 to supply a data voltage to each sub-pixel (SP), to the microcontroller 122. The timing controller 150 may transmit a touch control signal (TCS), which controls the source readout circuit 120 to drive the touch electrode of each sub-pixel (SP) so as to sense a touch input, to the microcontroller 122.

The timing controller 150 may receive a touch sync signal from the microcontroller 122, and may operate the source readout circuit 120 by dividing a time period within one frame into a display driving period and a touch driving period. The display driving period may be a period in which a data voltage is transferred to the sub-pixel (SP) of the panel 110, and the touch driving period may be a period in which a touch driving voltage is transferred to the sub-pixel (SP) of the panel 110.

The host 160 may supply at least one power to the power management circuit 123. The power management circuit 123 may generate a driving voltage from the power received from the host 160, and may supply the driving voltage to circuits in the display device 100 such as the panel 110, the source readout circuit 120, the microcontroller 122, the touch modulation circuit 121, the gate driving circuit 130 and the timing controller 150. Accordingly, the power supplied by the host 160 to the power management circuit 123 may be a source of power to be supplied by the power management circuit 123.

The host 160 may transfer information on the operation of the panel 110 to the microcontroller 122 of the panel 110 using a universal serial bus (USB) communication method, an inter-integrated circuit (I2C) communication method, or the like.

The power management circuit 123 may process the power received from the host 160 into a voltage and current suitable for each circuit, and may supply the processed voltage and current to each circuit.

The entirety or a part of a circuit configuration for performing a touch sensing operation and a display operation in the display device 100 may be defined as a touch sensing circuit, and a circuit configuration for receiving power and providing power to the inside of the display device 100 may be defined as a touch power circuit.

The entirety or a part of a circuit configuration in the display device 100 may be defined as a combination of conceptually distinguished circuit configurations. For example, a power circuit (not shown) may be defined as including the entirety or a part of the power management circuit 123 and including other circuit configurations.

Figure 2:
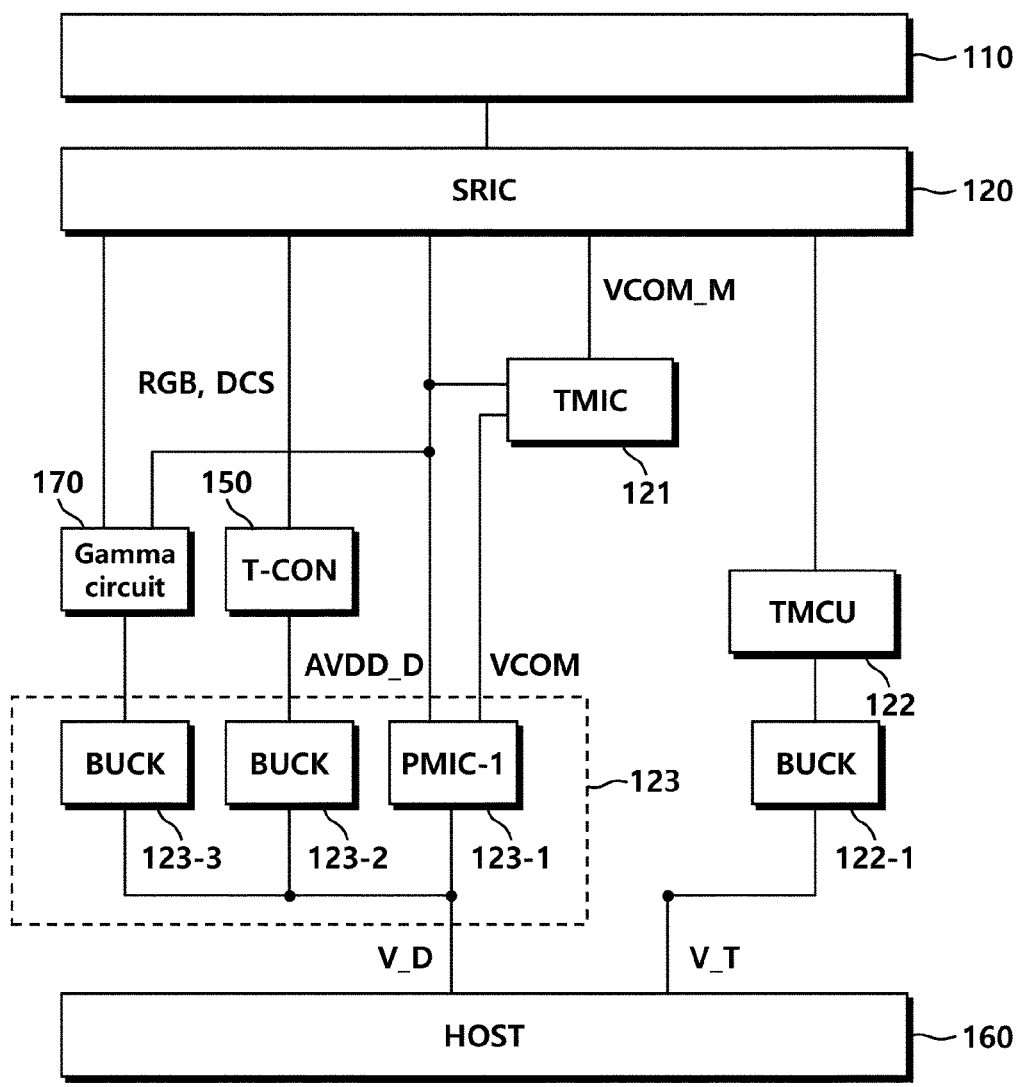
FIG. 2 is a diagram illustrating the configuration of the touch sensing circuit in accordance with the embodiment of the present disclosure, from the viewpoint of a power management circuit.

FIG. 2 is a diagram illustrating the configuration of the touch sensing circuit in accordance with the embodiment of the present disclosure, from the viewpoint of a power management circuit.

Referring to FIG. 2, the power management circuit 123 may include a first power circuit 123-1, a second power circuit 123-2 and a third power circuit 123-3.

The power management circuit 123 may be subdivided for respective functions, and may include therein the plurality of power circuits 123-1 to 123-3. The plurality of power circuits 123-1 to 123-3 may receive input power from the host 160 to generate power, and supply the power to circuits inside the display device 100. Voltages generated by the plurality of power circuits 123-1 to 123-3 to supply power may be defined by being distinguished as a first driving voltage, a second driving voltage and a third driving voltage.

Some of the plurality of power circuits 123-1 to 123-3 may drive a coupled circuit which is formed as a display circuit and a touch circuit are integrated together. The display circuit may include a circuit which is involved in the display operation of the display device 100 of outputting image data through pixels, and the touch circuit may include a circuit which is involved in the touch sensing operation of the display device 100 of sensing a touch or proximity of an external object through touch electrodes.

For example, the display circuit may include a gamma circuit 170 which generates a gamma voltage corresponding to a grayscale to generate a data voltage corresponding to image data RGB, the source driver circuit in the source readout circuit 120 which outputs the data voltage, and the timing controller 150 which controls the source driver circuit and supplies the image data RGB. The touch circuit may include the touch modulation circuit 121 which generates a touch driving voltage VCOM_M for driving a touch electrode, and the microcontroller 122 which controls the readout circuit included in the source readout circuit 120 and receives touch data to calculate touch coordinates.

Each of the display circuit and the touch circuit may be involved in only any one of the display operation and the touch sensing operation, but the coupled circuit may be involved in both the display operation and the touch sensing operation. The coupled circuit may have a form in which the display circuit and the touch circuit are integrated together. For example, the coupled circuit may include the source readout circuit (SRIC: source readout integrated circuit) 120 in which the source driver circuit and the readout circuit are integrated together.

The first power circuit 123-1 may generate a display analog voltage AVDD_D to drive the source readout circuit 120. The first power circuit 123-1 may generate an analog voltage (AVDD: analog VDD) to supply power. The display analog voltage AVDD_D may mean an analog voltage which is generated on the basis of the input power of the host 160. If necessary, the analog voltage (AVDD) generated by the first power circuit 123-1 may be defined as a first voltage.

The first power circuit 123-1 may generate a common voltage VCOM to drive the touch modulation circuit 121. The touch modulation circuit 121 may generate the touch driving voltage VCOM_M for driving a touch electrode, from the common voltage VCOM. The touch modulation circuit 121 may transfer the touch driving voltage VCOM_M to the source readout circuit 120.

The second power circuit 123-2 may convert power received from the host 160 to supply power to the timing controller 150. The second power circuit 123-2 may include a buck converter (BUCK). The second power circuit 123-2 may convert the input power of the host 160, and may drive the timing controller 150 through a converted voltage.

The third power circuit 123-3 may convert power received from the host 160 to supply power to the gamma circuit 170. The third power circuit 123-3 may include a buck converter (BUCK). The third power circuit 123-3 may convert the input power of the host 160, and may drive the gamma circuit 170 through a converted voltage.

A fourth power circuit (not shown) may convert power received from the host 160 to supply power to the microcontroller 122. The fourth power circuit may include a step down converter or a buck converter (BUCK) 122-1 which converts an output voltage to be lower than an input voltage. The fourth power circuit may transmit a converted voltage to the microcontroller (MCU: microcontroller unit) 122.

The source readout circuit 120 may operate through a driving voltage received from the first power circuit 123-1. The source readout circuit 120 may receive the display analog voltage AVDD_D to operate an internal circuit. The source driver circuit and the readout circuit which are integrated together in the source readout circuit 120 may operate using the display analog voltage AVDD_D as power.

The touch modulation circuit 121 may provide the driving voltage to the source readout circuit 120. The touch modulation circuit 121 may receive the common voltage VCOM from the first power circuit 123-1 to generate the touch driving voltage VCOM_M which drives a touch electrode. The touch modulation circuit 121 may receive a gate low voltage (VGL) and a gate high voltage (VGH) from a power circuit (not shown) to generate a modulated gate low voltage (VGL_M) to be applied to a touch electrode.

The timing controller 150 may operate by receiving power from the second power circuit 123-2. The timing controller 150 may transmit a control signal DCS and the image data RGB to control the source readout circuit 120.

The gamma circuit 170 may receive power from the third power circuit 123-3 to generate a gamma voltage. In addition, the gamma circuit 170 may receive the display analog voltage AVDD_D from the first power circuit 123-1. The amplifier of the gamma circuit 170 may be applied with a voltage from the third power circuit 123-3 through an input terminal, and may be applied with the display analog voltage AVDD_D through a bias terminal. The amplifier may generate the gamma voltage from the voltage of the third power circuit 123-3 and the display analog voltage AVDD_D.

The host 160 may supply input power, for example, main power (V_D) or sub power (V_T), through a power line to the power management circuit 123, and each power may be transferred to a plurality of power circuits inside the power management circuit 123. The type of the host 160 is not limited as long as the host 160 can supply power through an interface.

The display device 100 may operate in a normal mode, a display mode or a sleep mode.

The normal mode may define a state in which the display device 100 performs both display driving and touch driving, the display mode may define a state in which the display device 100 performs only display driving without performing touch driving, and the sleep mode may define a state in which the display device 100 performs only touch driving without performing display driving. Among the driving modes of the display device 100, in the normal mode, both the display circuit and the touch circuit may operate, in the display mode, the touch circuit may not operate and only the display circuit may operate, and in the sleep mode, the display circuit may not operate and only the touch circuit may operate.

Each driving mode of the display device 100 may be implemented by controlling the supply of power to be transferred to the display circuit and the touch circuit. For example, in the normal mode, the power management circuit 123 may supply power to both the display circuit and the touch circuit, in the display mode, the power management circuit 123 may supply power to the display circuit, and in the sleep mode, the power management circuit 123 may supply power to the touch circuit.

Figure 3:
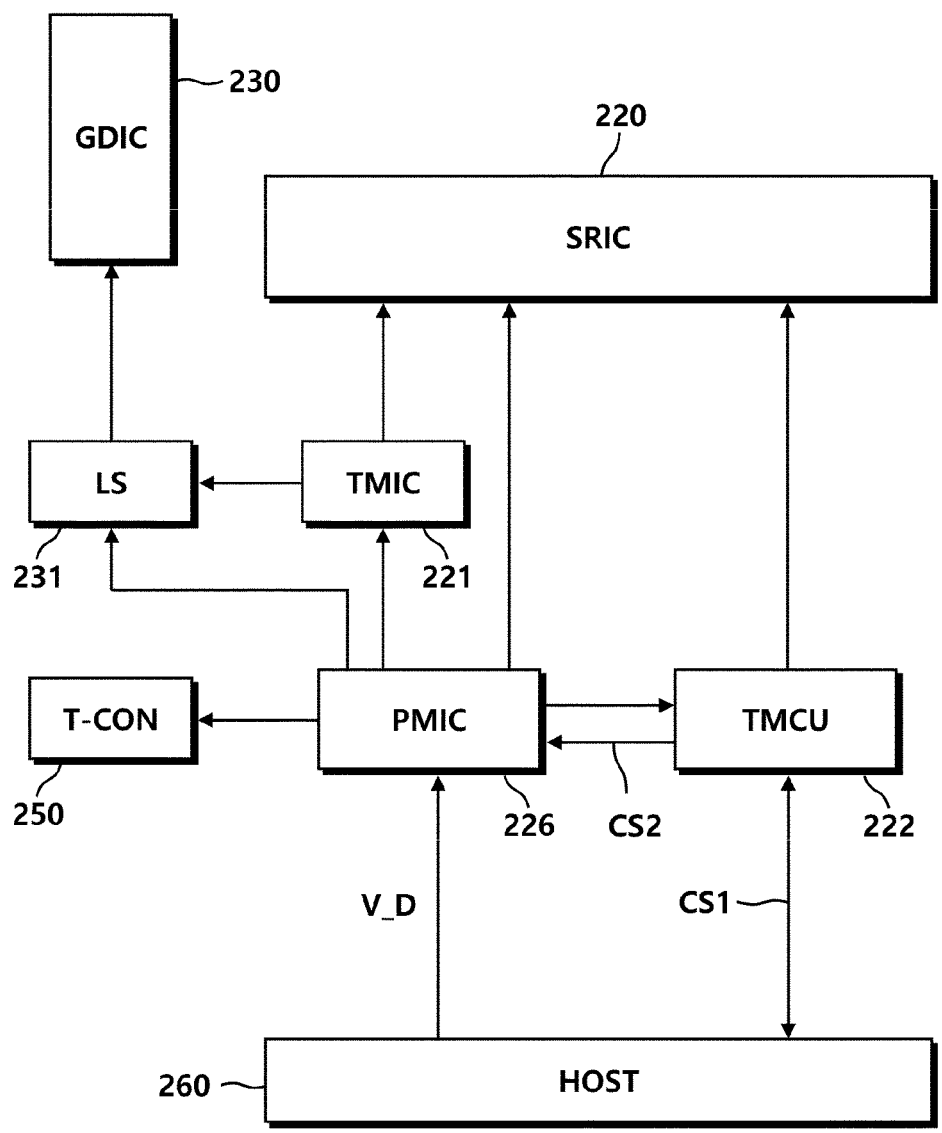
FIG. 3 is a block diagram illustrating a first example of the signal flow of a touch sensing circuit in accordance with an embodiment of the present disclosure.

FIG. 3 is a block diagram illustrating a first example of the signal flow of a touch sensing circuit in accordance with an embodiment of the present disclosure.

Referring to FIG. 3, a display device 200 may include a panel (not shown), a source readout circuit 220, a touch modulation circuit 221, a microcontroller 222, a power management circuit 226, a gate driving circuit 230, a level shifter 231, and a timing controller 250.

The panel, the source readout circuit 220, the touch modulation circuit 221, the microcontroller 222, the power management circuit 226, the gate driving circuit 230, the level shifter 231 and the timing controller 250 may include the circuit configuration and function of FIGS. 1 and 2 described above, and may include embodiments that may be implemented through modification by those skilled in the art.

The microcontroller 222 may receive touch data from the source readout circuit 220 to acquire and process touch information of the panel such as touch intensity and touch coordinates according to a proximity of an object.

The microcontroller 222 may perform unidirectional or bidirectional communication for transmitting/receiving touch data or control data of the panel to/from a host 260, by using an I2C communication method or a USB communication method.

The microcontroller 222 may receive information on a driving mode of the panel, for example, a normal mode, a display mode or a sleep mode, from the host 260 through the I2C communication method or the USB communication method. In this case, since it is possible to transmit/receive the information on the driving modes of the panel by utilizing an existing communication port and interface for transmitting and receiving touch data or control data as they are, the host 260 may set operating conditions of the microcontroller 222 even without adding a separate integrated circuit (IC) or a communication interface.

The microcontroller 222 may identify the driving modes of the panel as the normal mode, the display mode and the sleep mode. The normal mode may be defined as a mode in which a display circuit and a touch circuit of the panel operate, the display mode may be defined as a mode in which only the display circuit of the panel operates, and the sleep mode may be defined as a mode in which only the touch circuit of the panel operates.

The microcontroller 222 may generate a signal CS1 for controlling the operation of the power management circuit 226 in correspondence to each of the above-described driving modes of the panel, and may transfer the control signal to the power management circuit 226 through an IO (input-output) port or may transfer the control signal to the power management circuit 226 by the I2C communication method.

The power management circuit 226 may receive information on a driving mode of the panel from the microcontroller 222, and may differently change the state of an output signal according to the driving mode of the panel. For example, the intensity, timing and waveform of the output signal may be differently changed.

The state of the output signal of the power management circuit 226 may have one property in correspondence to the driving mode of the panel, but may have different properties according to a condition in which the driving mode of the panel is changed, for example, from the sleep mode to the normal mode or from the normal mode to the sleep mode.

For example, the power management circuit 226 may output a first output voltage in the normal mode, may output a second output voltage in the display mode, and may output a third output voltage in the sleep mode. The waveform, timing, intensity, etc. of each of the first to third output voltages may be controlled by a calculation device (not shown) in the power management circuit 226, the microcontroller 222 or the timing controller 250, or may be changed according to a preset setting value.

According to the driving mode of the panel, the power management circuit 226 may transfer the output signal by selecting all or some of the respective components of the display device 200, for example, the source readout circuit 220, the touch modulation circuit 221, the microcontroller 222, the gate driving circuit 230, the level shifter 231 and the timing controller 250.

When the driving mode of the panel is the normal mode, the power management circuit 226 may maintain power, for example, the first driving voltage, to be transferred to the source readout circuit 220, the touch modulation circuit 221, the microcontroller 222, the gate driving circuit 230, the level shifter 231 and the timing controller 250, in an on state.

When the driving mode of the panel is the sleep mode, the power management circuit 226 may reduce a power consumption amount by turning off power, for example, the first driving voltage, to be transferred to the gate driving circuit 230, the level shifter 231 and the timing controller 250. In this case, the power management circuit 226 may reduce a power consumption amount by supplying power, for example, the second driving voltage, to only the source readout circuit 220 and the touch modulation circuit 221.

The power management circuit 226 may supply power to the microcontroller 222 to maintain a touch sensing operation. In order to reduce the amount of power consumed by the microcontroller 222, the power management circuit 226 may include at least one buck converter (not shown). The power management circuit 226 may change a received voltage to a lower voltage by the buck converter, and may maintain a voltage suitable for driving the microcontroller 222.

The power management circuit 226 may independently manage and control power to be supplied to the display circuit and power to be supplied to the touch circuit.

In an in-cell type in which a touch sensing operation and a display operation are implemented in one panel, the touch sensing operation and the display operation are not electrically separated and share a circuit configuration, and thus, by electrically separating and independently driving the display circuit and the touch circuit, the power management circuit 226 may stably implement the touch sensing operation and the display operation.

The touch modulation circuit 221 may receive the output voltage of the power management circuit 226, and during a touch driving period, may synchronize and modulate a voltage to be transferred to the source readout circuit 220 and a voltage to be transferred to the level shifter 231 connected to the gate driving circuit 230. In this case, the source readout circuit 220 and the gate driving circuit 230 may operate simultaneously or in an interconnected manner to have a predetermined temporal connection relationship.

According to the above-described method, the external host 260 may transmit data S3_MODE regarding the driving mode of the panel to the microcontroller 222, and the microcontroller 222 may transmit a power control signal CS2 which controls the output signal of the power management circuit 226, to the power management circuit 226 on the basis of the data S3_MODE regarding the driving mode of the panel.

As shown in FIG. 3, when the operation of the power management circuit 226 is controlled by the microcontroller 222, it is possible to change the output signal of the power management circuit 226 regardless of power inputted to the power management circuit 226 through a power line, for example, main power V_D or sub power V_T.

Figure 4:
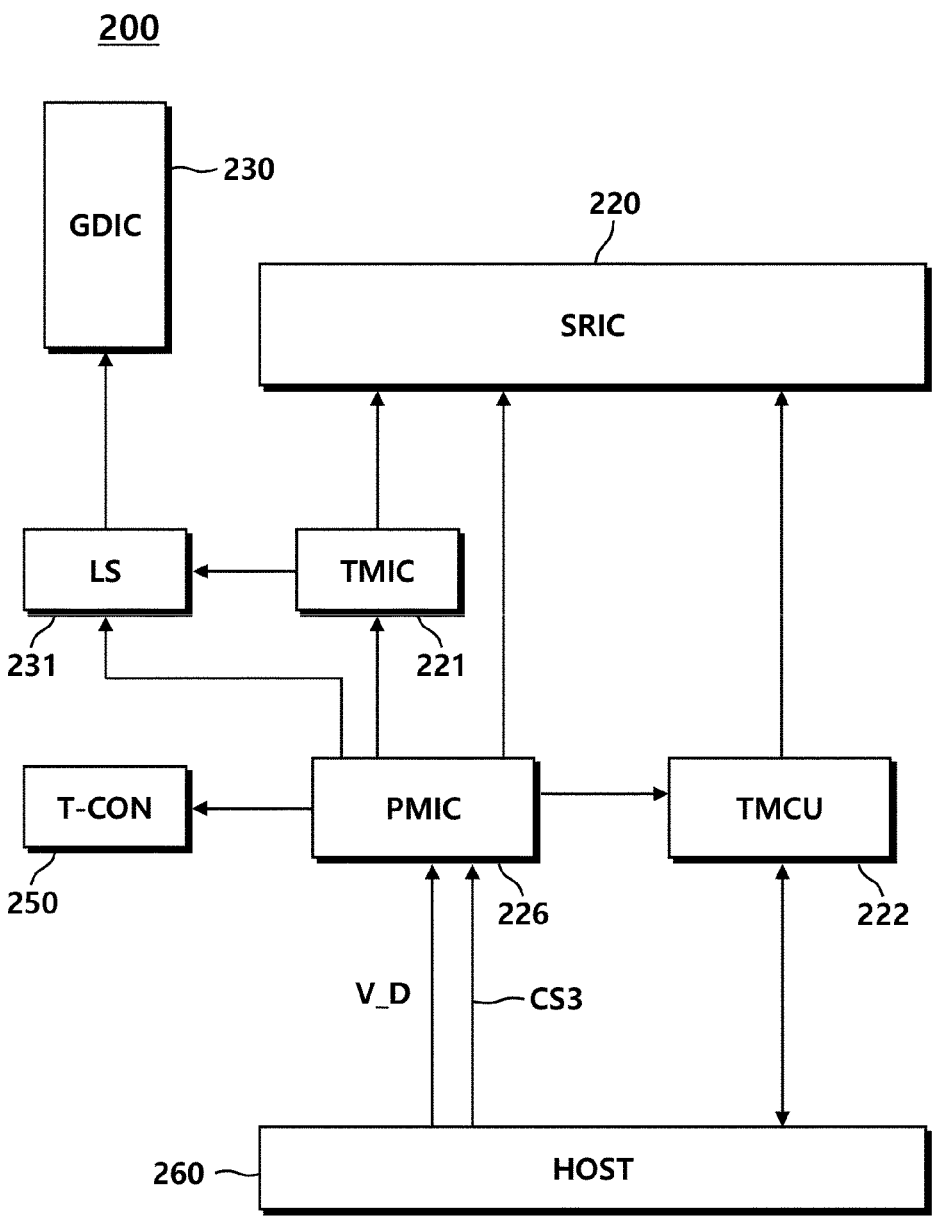
FIG. 4 is a block diagram illustrating a second example of the signal flow of the touch sensing circuit in accordance with the embodiment of the present disclosure.

FIG. 4 is a block diagram illustrating a second example of the signal flow of the touch sensing circuit in accordance with the embodiment of the present disclosure.

Referring to FIG. 4, the power management circuit 226 may receive a power control signal CS3 which controls the output signal of the power management circuit 226, directly from the external host 260 without going through a separate integrated circuit (IC).

In this case, the external host 260 may transmit information on the driving mode of the panel to the power management circuit 226 through an IO port without going through a separate integrated circuit (IC), and thus, the loss rates of communication speed and data may be reduced.

Figure 5:
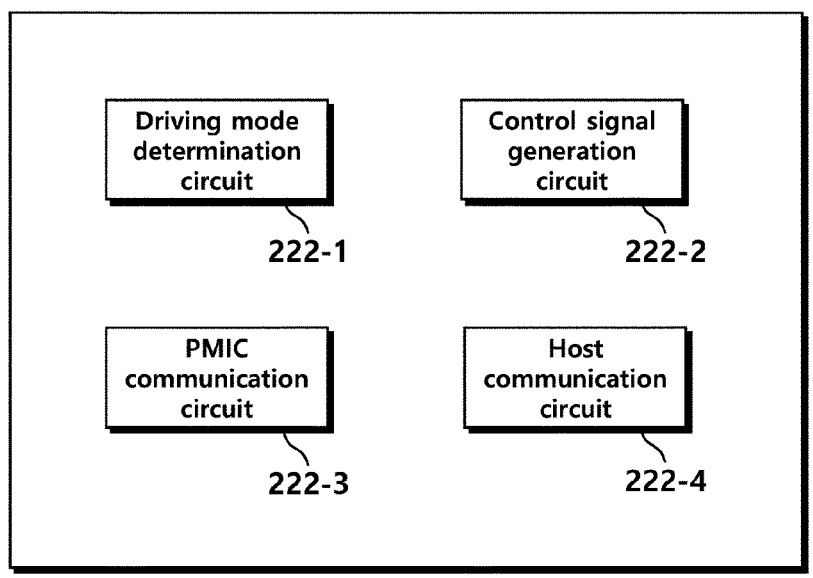
FIG. 5 is a block diagram of a microcontroller in accordance with an embodiment of the present disclosure.

FIG. 5 is a block diagram of a microcontroller in accordance with an embodiment of the present disclosure.

Referring to FIG. 5, the microcontroller 222 may include a driving mode determination circuit 222-1, a control signal generation circuit 222-2, a power management circuit communication circuit 222-3, and a host communication circuit 222-4.

The driving mode determination circuit 222-1 may be a circuit which receives information on a driving mode of a panel from a host device (not shown) and determines a display or touch sensing operation of the panel in correspondence to the driving mode of the panel.

The driving mode determination circuit 222-1 may determine the driving mode of the panel as one of a first mode in which both display and touch sensing operations are performed, a second mode in which only the display operation is performed and a third mode in which only the touch sensing operation is performed.

The driving mode determination circuit 222-1 may receive the information on the driving mode of the panel from the host device by using an existing communication interface connected between the host device and the microcontroller 222 as it is. The driving mode determination circuit 222-1 may update information on the operation of the panel, and may transmit the information on the operation of the panel to the host device.

The driving mode determination circuit 222-1 may determine the touch or display state of the panel as on or off, and may define an operating condition of the panel. For example, the driving mode determination circuit 222-1 may classify the state of the panel into a display on state, a display off state, a touch on state and a touch off state, and thereby, may set a driving mode condition of the panel in correspondence to a driving period of the panel.

The control signal generation circuit 222-2 may generate a power control signal which changes an output signal to be transferred by a power management circuit to correspond to a driving mode of the panel set by the driving mode determination circuit 222-1.

The power control signal generated by the control signal generation circuit 222-2 may be a control signal which determines and controls an operation state of the power management circuit. For example, the power control signal may be a signal which controls the intensity of a voltage to be outputted by the power management circuit when a driving mode of the panel is the first mode, to a first voltage, and controls the intensity of a voltage to be outputted by the power management circuit when a driving mode of the panel is the second mode, to a second voltage different from the first voltage. In this case, by adjusting the state of the output signal of the power management circuit, it is possible to reduce an amount of power consumed in each circuit or to provide appropriate power according to a driving mode of the panel.

In addition, the power control signal generated by the control signal generation circuit 222-2 may be a control signal which controls a target to which the output signal of the power management circuit is transferred. For example, the power control signal may change a target to which the output signal of the power management circuit is to be transferred, from a circuit for touch driving to a circuit for display driving, or may transfer the output signal of the power management circuit to both the circuit for touch driving and the circuit for display driving. In this case, by adjusting a target to which the output signal of the power management circuit is to be transferred, it is possible to reduce standby power consumed in each circuit.

As the control signal generation circuit 222-2 changes the state of the output signal of the power management circuit and at the same time changes a transfer target of the output signal, it is possible to effectively control an amount of power consumed in the process of driving the panel.

The power management circuit communication circuit 222-3 may be a circuit which transfers the power control signal generated by the control signal generation circuit 222-2 to the power management circuit. For example, the power management circuit communication circuit 222-3 may use an IO port or an I2C communication method to transfer the power control signal from the microcontroller 222 to the power management circuit.

The host communication circuit 222-4 may be a circuit for transmitting and receiving touch data and touch control data to and from the host device in the I2C communication method or a USB communication method. In addition, the host communication circuit 222-4 may use the I2C communication method or the USB communication method in order to transfer the information on the driving mode of the panel from the host device to the microcontroller 222 by utilizing a previously formed communication interface.

The above-described respective components 222-1, 222-2, 222-3 and 222-4 of the microcontroller 222 may represent blocks which are conceptually divided to explain the function and operation of the microcontroller 222, but are not limited thereto.

Figure 6:
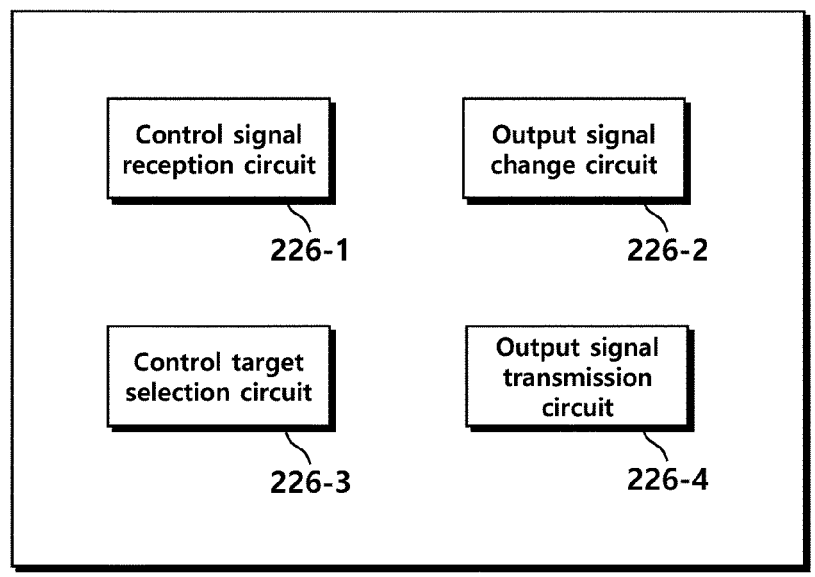
FIG. 6 is a block diagram of a power management circuit in accordance with an embodiment of the present disclosure.

FIG. 6 is a block diagram of a power management circuit in accordance with an embodiment of the present disclosure.

Referring to FIG. 6, the power management circuit 226 may include a control signal reception circuit 226-1, an output signal change circuit 226-2, a control target selection circuit 226-3, and an output signal transmission circuit 226-4.

The control signal reception circuit 226-1 may be a circuit which receives a power control signal for controlling the power management circuit 226 from the microcontroller 222.

The microcontroller 222 may receive information on a driving mode of a panel by communicating with an external host device (not shown), and may generate the power control signal for the power management circuit 226 by processing the corresponding information.

The information on the driving mode of the panel may include information on an operation of a touch circuit or a display circuit of the panel, and the driving mode of the panel may include a normal mode, a display mode and a sleep mode. The information on the driving mode of the panel may be updated for each time period, for example, one frame or a partial frame. The power management circuit 226 may receive the power control signal based on updated information, and may change a state of an output signal in real time.

For example, the normal mode may be defined as a mode in which the display circuit and the touch circuit of the panel operate, the display mode may be defined as a mode in which only the display circuit of the panel operates, and the sleep mode may be defined as a mode in which only the touch circuit of the panel operates.

The microcontroller 222 as a circuit for acquiring touch information of the panel may be defined as a microcontroller unit (MCU) or a microprocessor, and may determine the driving mode of the panel, without adding a separate interface, by receiving the information on the driving mode of the panel through an interface connected to the external host device.

The output signal change circuit 226-2 may be a circuit which changes the output signal of the power management circuit 226 in response to the power control signal transferred by the microcontroller 222.

The power control signal transferred by the microcontroller 222 may be a control signal which changes a state of the output signal according to a touch driving period and a display driving period. When the panel is driven by being time-divided into touch driving and display driving, a state of the output signal may be differently changed for each driving period.

The output signal change circuit 226-2 may adjust the intensity, interval, output timing, end timing, waveform, etc. of the output signal in response to the power control signal.

The output signal change circuit 226-2 may change all or some of control target circuits from an on state to an off state in response to the driving mode of the panel.

The control target selection circuit 226-3 may be a circuit which selects a control target circuit to which the output signal of the power management circuit 226 is to be transferred.

The control target selection circuit 226-3 may define candidate circuits to which the output signal of the power management circuit 226 may be transferred, as the group of the source readout circuit 220, the touch modulation circuit 221, the microcontroller 222, the power management circuit 226, the gate driving circuit 230, the level shifter 231 and the timing controller 250, and may select a control target circuit to which the output signal of the power management circuit 226 is to be transferred, by selecting at least one element of the group.

For example, the control target selection circuit 226-3 may select, as a control target circuit, at least one of the source readout circuit 220 which performs a touch or display operation, the timing controller 250 which determines an operation timing of the source readout circuit 220 or a power circuit, and the microcontroller 222, and may select all or some of internal circuit components of the above-described panel as control target circuits.

The control target selection circuit 226-3 may select a control target circuit in response to a driving mode of the panel.

For example, when the driving mode of the panel is the sleep mode, the control target selection circuit 226-3 may select the source readout circuit 220 and the touch modulation circuit 221 as control target circuits.

The output signal transmission circuit 226-4 may be a circuit for transferring the output signal to the control target circuit.

The output signal transmission circuit 226-4 may transmit the output signal to the control target circuit through a signal line connected to the control target circuit, and may adjust the connection relationship of the signal line to be short-circuited or opened in response to an external control signal. If necessary, the output signal transmission circuit 226-4 may transmit the output signal by changing a transfer target of the output signal of the power management circuit 226 or changing a state of the output signal, without changing the connection relationship of the signal line.

For example, the power management circuit 226 may transfer the output signal to a control target circuit while maintaining a state electrically connected to a candidate circuit by a port.

The above-described respective components 226-1, 226-2, 226-3 and 226-4 of the power management circuit 226 may represent blocks which are conceptually divided to explain the function and operation of the power management circuit 226, but are not limited thereto.

Figure 7:
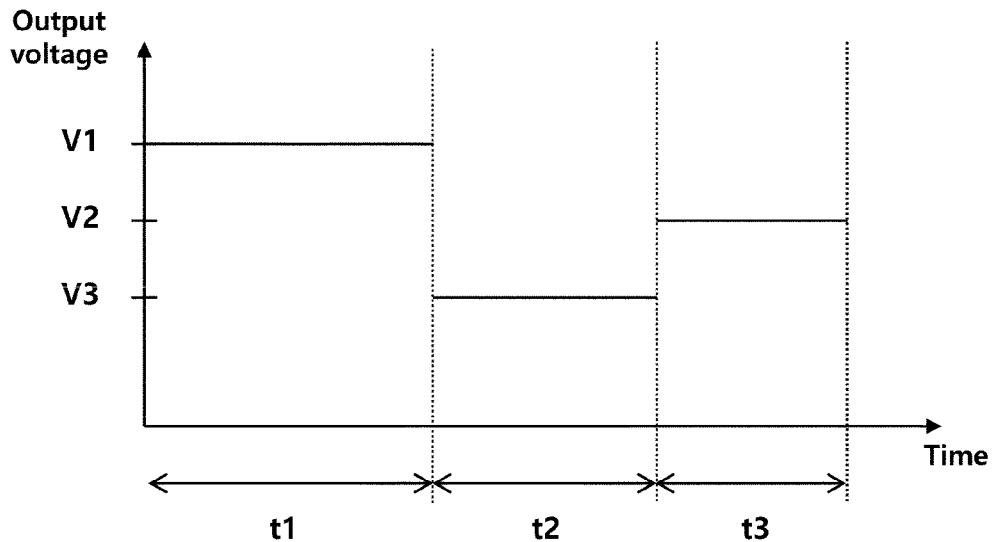
FIG. 7 is a first exemplary diagram explaining an output signal change process of a power management circuit in accordance with an embodiment of the present disclosure.

FIG. 7 is a first exemplary diagram explaining an output signal change process of a power management circuit in accordance with an embodiment of the present disclosure.

Referring to FIG. 7, a method 300 for changing an output signal of a power management circuit may be defined as a first time period t1, a second time period t2, and a third time period t3.

The output signal of the power management circuit may be a voltage, and may be changed in voltage level from a first voltage V1 to a third voltage V3 when the first time period t1 is changed to the second time period t2. Also, the output signal of the power management circuit may be changed in voltage level from the third voltage V3 to a second voltage V2 when the second time period t2 is changed to the third time period t3.

The output signal of the power management circuit may have one state corresponding to a driving mode of a panel, and in this case, the first time period t1, the second time period t2 and the third time period t3 may be defined as time periods having different driving modes.

The output signal of FIG. 7 is to explain the method of changing an output signal of a power management circuit according to a change in the driving mode of the panel. The output signal of the power management circuit may be a signal having a sinusoidal curve, a signal having at least one pulse, a signal expressed by Fourier series, etc., but is not limited thereto.

Figure 8:
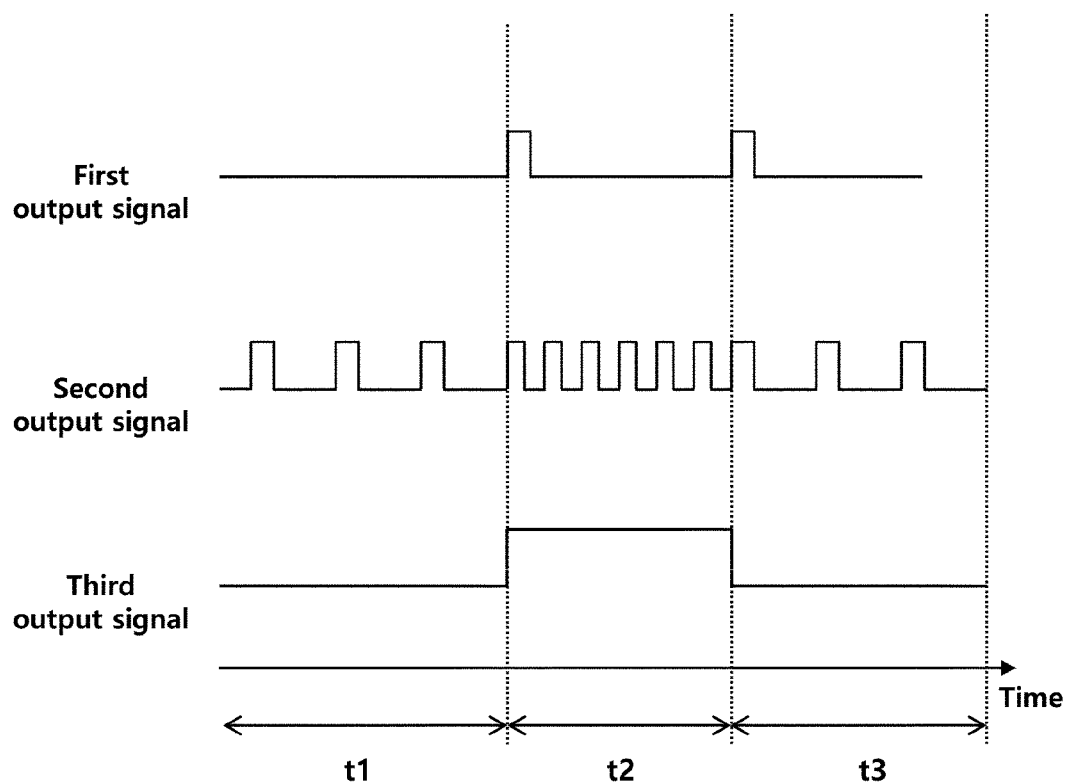
FIG. 8 is a second exemplary diagram explaining an output signal change process of a power management circuit in accordance with an embodiment of the present disclosure.

FIG. 8 is a second exemplary diagram explaining an output signal change process of a power management circuit in accordance with an embodiment of the present disclosure.

Referring to FIG. 8, a method 400 for changing an output signal of a power management circuit may be defined as a first time period t1, a second time period t2, and a third time period t3.

A first output signal may transfer one pulse when the first time period t1 is changed to the second time period t2, and may transfer one pulse when the second time period t2 is changed to the third time period t3. In this case, one pulse may be a starting signal which defines a start time point of a control target circuit, but is not limited thereto.

A second output signal may transfer an output waveform having a first frequency in the first time period t1, may transfer an output waveform having a second frequency in the second time period t2, and may transfer the output waveform having the first frequency in the third time period t3. The number of pulses, the interval of the pulses, etc. may vary in each time period.

A third output signal may maintain a state in which no signal is transferred in the first time period t1 and the third time period t3, and may transfer a signal in the second time period t2.

The output signal of the power management circuit may have one state corresponding to a driving mode of a panel, and in this case, the first time period t1, the second time period t2 and the third time period t3 may be defined as time periods having different driving modes.

The first to third output signals are examples that explain various modified embodiments for changing a state of the output signal of the power management circuit, but the technical spirit of the present disclosure is not limited thereto.

Figure 9:
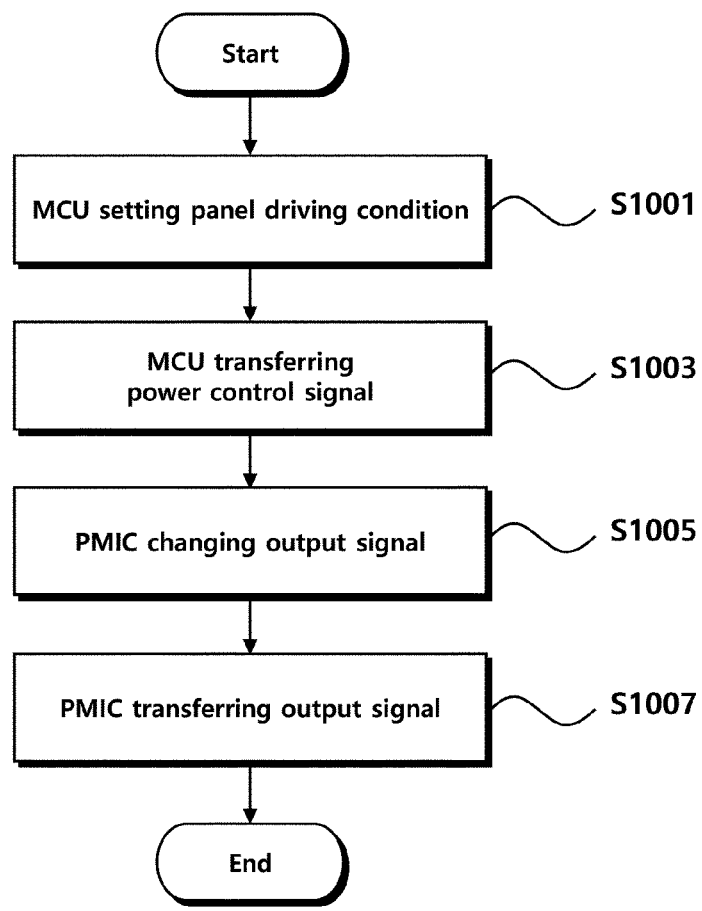
FIG. 9 is a diagram explaining a process for the operation of a power management circuit in accordance with an embodiment of the present disclosure.

FIG. 9 is a diagram explaining a process for the operation of a power management circuit in accordance with an embodiment of the present disclosure.

Referring to FIG. 9, a method 1000 for operating a power management circuit may include setting a driving condition of a panel by a microcontroller (S1001), transferring a power control signal by the microcontroller (S1003), changing a state or a target of an output signal by the power management circuit (S1005), and transferring the output signal to a control target circuit by the power management circuit (S1007).

The setting of the driving condition of the panel by the microcontroller (S1001) may be step in which the microcontroller receives data regarding the driving of the panel from an external host device (not shown) and sets the driving condition of the panel.

The driving mode of the panel may be a set of driving methods that are defined according to whether a display circuit and a touch circuit of the panel operate. For example, the microcontroller may define whether to perform a display operation of the panel in a display period, and may define whether to perform a touch sensing operation of the panel in a touch period.

The transferring of the power control signal by the microcontroller (S1003) may be step in which the power control signal for controlling the output signal of the power management circuit according to the driving condition of the panel is generated and is transferred to the power management circuit.

Although the power management circuit may include therein a calculation device, the function of changing the output signal may be performed by the microcontroller, and the power management circuit may not include therein a calculation device. In this case, even without performing a calculation in the power management circuit, the output signal of the power management circuit may be changed.

The changing of the state or the target of the output signal by the power management circuit (S1005) may be step in which the output signal of the power management circuit is changed in response to the power control signal transferred from the microcontroller.

For example, the power management circuit may change the output signal to be reduced in response to the power control signal for reducing the intensity of the output signal, and may change a target to which the output signal is to be transferred, in response to the power control signal for changing a target of the output signal.

The state or target of the output signal of the power management circuit may be variously changed by the power control signal. In this regard, the state of the output signal may be changed and the target may be maintained, or the state of the output signal may be maintained and the target may be changed.

For example, when the driving mode of the panel is a mode in which the display operation is not performed, the intensity of the output signal of the power management circuit may be maintained, and a target circuit may be determined as a circuit for the touch sensing operation of the panel. When the driving mode of the panel is a mode in which both the display and touch sensing operations are performed, both a circuit for the display operation and a circuit for the touch sensing operation among candidate circuits may be determined as control target circuits.

The transferring of the output signal to the control target circuit by the power management circuit (S1007) may be step in which an analog signal is transferred to the control target circuit through a signal line connected to the power management circuit.

Figure 10:
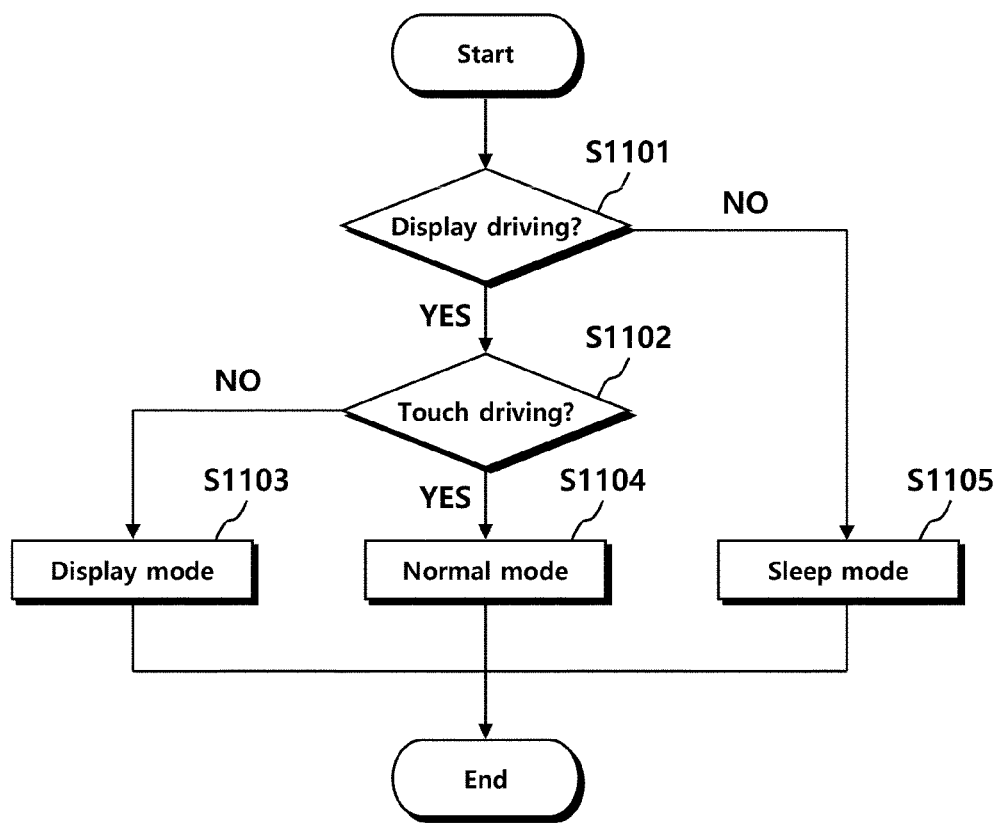
FIG. 10 is a diagram explaining driving modes of a panel in accordance with an embodiment of the present disclosure.

FIG. 10 is a diagram explaining driving modes of a panel in accordance with an embodiment of the present disclosure.

Referring to FIG. 10, a method 1100 of determining an operation mode of a panel may include determining whether to perform display driving (S1101), determining whether to perform touch driving (S1102) and determining driving modes of the panel (S1103, S1104 and S1105), and the sequence of respective steps may be changed.

The determining of whether to perform the display driving (S1101) may be step of determining whether to perform the display driving of the panel, by an external host (not shown) or a microcontroller (not shown).

The determining of whether to perform the touch driving (S1102) may be step of determining whether to perform the touch driving of the panel, by the external host or the microcontroller.

The determining of the driving modes of the panel (S1103, S1104 and S1105) may be step of determining the driving modes of the panel according to results of the determining of whether to perform the display driving (S1101) and the determining of whether to perform the touch driving (S1102).

A display mode (S1103) may be step of performing a display operation by driving only a display circuit in a source driver circuit.

A normal mode (S1104) may be step of performing a display operation by driving both the display circuit and a touch circuit in the source driver circuit.

A sleep mode (S1105) may be step of performing a display operation by driving only the touch circuit in the source driver circuit.

Information on the display mode (S1103), the normal mode (S1104) and the sleep mode (S1105) may be determined according to conditions or setting values stored in the microcontroller, and the operation of a power management circuit may be changed as the driving mode of the panel is changed in correspondence to the timing of a timing controller (not shown).

What is claimed is:

1. A power management circuit comprising:
a control signal reception circuit configured to receive a power control signal, for controlling an operation of the power management circuit in correspondence to a driving mode of a panel, from a microcontroller which receives information on the driving mode of the panel;
an output signal change circuit configured to change an output signal of the power management circuit in response to the power control signal;
a control target selection circuit configured to select a control target circuit to which the output signal is to be transferred; and
an output signal transmission circuit configured to transfer the output signal to the control target circuit.

2. The power management circuit according to claim 1, wherein
the driving mode of the panel includes a normal mode, a display mode, and a sleep mode,
the normal mode is a mode in which a display circuit and a touch circuit of the panel operate,
the display mode is a mode in which only the display circuit of the panel operates, and
the sleep mode is a mode in which only the touch circuit of the panel operates.

3. The power management circuit according to claim 1, wherein
the microcontroller is configured to communicate with a host device to receive the information on the driving mode of the panel, and
the information on the driving mode of the panel includes information on an operation of the touch circuit and/or an operation of the display circuit of the panel.

4. The power management circuit according to claim 1, wherein the microcontroller is a circuit which is configured to acquire touch information of the panel and receive the information on the driving mode of the panel through an interface connected with the host device.

5. The power management circuit according to claim 1, wherein the power control signal received by the control signal reception circuit is to change a state of the output signal according to a touch driving period and a display driving period.

6. The power management circuit according to claim 1, wherein the output signal change circuit is configured to adjust an intensity of the output signal and/or an interval between output signals in response to the power control signal.

7. The power management circuit according to claim 1, wherein the output signal change circuit is configured to change an entirety or a part of the control target circuit to be in an off state based on the driving mode of the panel.

8. The power management circuit according to claim 1, wherein the control target selection circuit is configured to select, as the control target circuit, at least one of a source readout circuit capable of performing a touch or display operation, a timing controller capable of determining an operation timing of the source readout circuit, the power management circuit, and the microcontroller.

9. The power management circuit according to claim 1, wherein the output signal transmission circuit is configured to transfer the output signal to the control target circuit through a signal line connected to the control target circuit.

10. A microcontroller for acquiring touch information of a panel, comprising:
- a driving mode determination circuit configured to receive information on a driving mode of the panel from a host device and to determine a touch or display operation of the panel;
- a control signal generation circuit configured to generate a power control signal which changes an output signal of a power management circuit in correspondence to the driving mode of the panel; and
- a communication circuit configured to communicate with the power management circuit by transferring the power control signal to the power management circuit.

11. The microcontroller according to claim 10, wherein the driving mode determination circuit is configured to identify a touch or display state of the panel as on or off and define an operating condition of the panel.

12. The microcontroller according to claim 10, wherein the driving mode determination circuit is configured to determine, by communicating with the host device, the driving mode of the panel as one of a first mode in which both display and touch sensing operations are performed, a second mode in which only the display operation is performed and a third mode in which only the touch sensing operation is performed.

13. The microcontroller according to claim 10, wherein the control signal generation circuit is configured to generate the power control signal which controls the output signal to be transferred to a touch circuit or a display circuit of the panel by the power management circuit such that the output signal corresponds to the driving mode of the panel determined by the driving mode determination circuit.

14. The microcontroller according to claim 10, wherein the power control signal is configured to trigger changing a target to which the output signal of the power management circuit is to be transferred or a state of the output signal according to the driving mode of the panel.

15. The microcontroller according to claim 10, wherein the communication circuit is configured to perform communication by defining the microcontroller as a master which is configured to transfer the power control signal and defining the power management circuit as a slave which is configured to receive the power control signal.

16. A method of operating a power management circuit, comprising:
- receiving information on a driving mode of a panel from a microcontroller;
- determining an output signal of the power management circuit corresponding to the driving mode of the panel;
- determining a target circuit to which the output signal is to be transferred, among candidate circuits having a possibility of receiving the output signal; and
- transferring the output signal to the target circuit.

17. The method according to claim 16, wherein
- the driving mode of the panel is a sleep mode in which a display circuit of the panel does not operate and a touch circuit of the panel operates, and
- the output signal of the power management circuit is changed to have a lower intensity as compared to a driving mode, which is not the sleep mode.

18. The method according to claim 16, wherein, when the driving mode of the panel is a mode in which a display operation is not performed, the intensity of the output signal of the power management circuit is maintained and the touch circuit of the panel is determined as the target circuit.

19. The method according to claim 16, wherein when the driving mode of the panel is a normal mode in which a display circuit and a touch circuit of the panel operate, the output signal of the power management circuit is transferred to all of the candidate circuits.

20. The method according to claim 16, wherein, when the driving mode of the panel is changed, the microcontroller is configured to transfer to the power management circuit a power control signal which controls at least one of an intensity, a frequency and a waveform of the output signal of the power management circuit.

* * * * *